United States Patent Office 2,950,286
Patented Aug. 23, 1960

2,950,286

BASIC DYE SALTS OF POLYSULFONATED PHTHALOCYANINES AND PROCESS OF PRODUCING THE SAME

Calvin Quentin Miller, Newark, Del., and William Wade Ranson, Woodstown, N.J., assignors to E. I. du Pont de Nemours and Company, Wilmington, Del., a corporation of Delaware No Drawing. Filed June 30, 1958, Ser. No. 745,285

6 Claims. (Cl. 260—314.5)

This invention relates to dye salts adapted for use as coloring matter for ball-pen inks. More particularly, this invention deals with salts of basic dyes and metal- or metal-free phthalocyanine polysulfonic acids of improved solubility in glycolic solvents.

As is well known, ball pens, that is pens employing a revolving ball as pen point, usually employ as ink supply a cartridge containing the ink in a creamy or semi-pasty state, which yields to pressure and becomes sufficiently fluid in the vicinity of the writing ball to produce a legible trace on the writing surface. Such inks must possess very special physical properties for proper functioning. Thus, the ink must be stable against polymerization or caking when held for a long time in the ink barrel; it must be non-corrosive to the material of the barrel; it must be capable of flowing from the barrel of the pen in a continuous, even though fine, stream, so as to produce continuous lines and characters upon the written surface.

As a result of such drastic demands, the industry has essentially settled upon the use of glycols as the liquid vehicle for ball-pen inks. More customarily, liquid alkanediols are employed such as ethylene glycol, propylene glycol, 2-methyl-2,4-pentanediol and other similar compounds having from 2 to 8 C-atoms. However, monoalkyl ethers of glycols are also suitable, for instance the lower monoalkyl ethers (1 to 4 C-atoms) of diethylene glycol (known in trade as "Carbitols").

There remains now the problem of selecting the proper coloring matter for the ink. To be suitable for the purpose stated, the coloring matter itself must satisfy several important demands. First of all, it must have satisfactory light fastness, so that a record made with the resulting ink, shall not fade away if left exposed for a long stretch of time. Secondly, it must be capable of being incorporated into the ink to a very high concentration, so that it will produce a strong, legible writing. Thirdly, it should be free of grit; fourthly, the writing produced by the ink shall not spread out, bleed or diffuse through the paper into a featured pattern, preferably even if the paper is damp. Fifthly, the ink thus produced must fall within certain, hitherto determined limits of viscosity, so as not to flow too freely nor hold back in the course of writing. Various other practical requirements can be enumerated, but for the present purpose the above will do.

The first requirement above has heretofore often been satisfied by employing a pigment as part of the coloring matter, particularly a phospho-tungstic or phospho-tungsto-molybdic salt of a basic dye. Such pigment being insoluble in glycolic solvents, the second requirement was then satisfied by suspending the coloring matter in finely divided but solid state in the glycolic vehicle.

Such a solution to the problem is not however entirely satisfactory, because the employment of solid suspensions results in writings which are not fast to crocking (i.e. they rub off easily when dried). Furthermore, the viscosity of such inks is difficult to control, and caking at the ball point of the pen often interferes with the free flow of the ink.

It occurred to us that the problem of light fastness might be solved by employing a coloring matter of the phthalocyanine series, whose shade of color can be readily controlled by combining a sulfonic acid thereof with a basic dye to form a salt. Such salts, as a general class, are not novel. They are mentioned, for instance, in U.S.P. 2,187,816, issued January 23, 1940. We have found, however, that as a general proposition, salts of this type are insufficiently soluble in glycolic solvents to satisfy the requirements of a ball-pen ink. In particular, taking 2-methyl-2,4-pentanediol as standard for solubility tests, we find that the color obtained from Diamond Green GX and copper phthalocyanine sulfonic acid, prepared according to Example 10 of said patent, dissolves in said solvent to a concentration of less than 29% by weight. This is not satisfactory for practical purposes, inasmuch as the commercial specifications for a ball-pen ink require a concentration of color of at least 45%, and preferably over 50%, by weight.

It is accordingly an object of this invention to provide novel basic dye salts of sulfonated phthalocyanines characterized by high solubility in glycolic solvents. Another object of this invention is to provide a convenient process for achieving said first mentioned object. A still further object is to provide novel ink compositions for ball-pen inks, which are characterized by high color concentration, good light fastness, optimum viscosity, and stability with respect to polymerizing or caking in storage. Various other objects and achievements of this invention will appear as the description proceeds.

Our invention is based first of all on the discovery that the solubility of basic dye salts of sulfonated phthalocyanines in glycolic solvents depends first of all on the degree of sulfonation of the phthalocyanine compound. We find that a minimum of 2 sulfo groups per molecule is essential, but the average content may be larger, say, up to 4 sulfo groups per molecule. It is noted in this connection that copper phthalocyanine sulfonic acid prepared according to Example 10 of U.S.P. 2,187,816 has been found by experiment to contain an average of but 1.43 $SO_3H$ groups per molecule, and this factor in itself accounts to a considerable degree for the low solubility of the resulting salt with Diamond Green GX in 2-methyl-2,4-pentanediol.

Secondly, we have found that the reaction of salt formation between said phthalocyanine polysulfonic acid and the average basic dye can be conducted in two distinct manners whereby to precipitate the reaction product either in the form of a granular solid or in the form of a viscous melt or a non-filterable tarry mass, and that while both forms are insoluble in water, the manner chosen for its formation affects the suitability of the product.

The granular form is generally obtainable when the reactants are brought together at relatively low temperature, say room temperature to 60° C., the one reactant or both being in solution in a convenient solvent (water or alcohol), while the other may be in solution or may be fed in as a finely divided powder. The homogeneous tarry form, however, is obtained by working under special conditions, namely:

(a) Working in the presence of water;
(b) Using both reactants in the form of solutions, the phthalocyanine color being dissolved in water, while the basic color may be dissolved in water, alcohol or a mixture of the two;
(c) Working at temperatures near the boiling point of the mixture, that is, in the range of 75° to 100° C.

The products of these two different procedures are not identical as far as practical results are concerned. We find that the tarry product of the second procedure may be dried to give a brittle mass, which in turn may be ground into a fine powder, and that the latter is usually considerably more soluble in glycolic solvents than a dry powder obtained from the granular product above mentioned. For instance, when Diamond Green GX is reacted with copper phthalocyanine polysulfonic acid (of 1.43 $SO_3H$ groups per molecule) under the second of said procedures (going through the tarry stage), its solubility in 2-methyl-2,4-pentanediol rises to about 44% compared to the aforementioned solubility of less than 29% for the granular product.

Furthermore, we find that dye salts already prepared and isolated according to the granular procedure may be treated with water at temperatures in the range of 80° C. to 100° C., whereby they become molten or tarry and acquire (upon drying) the higher solubility characteristic of the tarry procedure of synthesis. It is clearly apparent that the physical form of the two products is different in the two cases, the difference generally expressing itself in a higher solubility in glycolic solvents for the tarry product after it has been dried and ground.

As already indicated, the essential difference between the two modes of procedure is temperature. Taking for reference a procedure wherein the salt is prepared by mixing an aqueous solution of a sulfonated phthalocyanine with an aqueous solution of a basic dye, the two solutions can be mixed and maintained at a temperature below 60° C., whereupon the reaction product separates in granular form, which can be readily filtered off the aqueous phase. Such a procedure seems to have been employed in Example 10 of U.S.P. 2,187,816, inasmuch as the product there was filtered off by suction and dried. On the other hand, the mixed solutions may be heated to a temperature above 75° C., and preferably in the range of 80° to 100° C., whereupon the reaction product precipitates in molten state. The precipitate is of a tarry nature and cannot be filtered. The supernatant aqueous phase may be decanted off, however, and the residual molten material may be dried at a temperature not exceeding 105° C., or at a lower temperature (say 70° to 75° C.) under reduced pressure, to produce a brittle dry mass.

We have already mentioned the higher solubility in 2-methyl-2,4-pentanediol of the product of the tarry process. The exact maximum concentration obtainable depends on the nature of the basic dye selected (assuming the same sulfonated phthalocyanine component). The viscosity of the more highly concentrated solutions of the salts of this invention in glycolic solvents generally falls within the range of 5000 to 15,000 centipoises, which is the viscosity generally required by the ball-pen industry. The concentrated solutions thus prepared are therefore adapted for use directly as ball-pen inks, without admixture of any pigments, resins or other agents hitherto required when other coloring matters are employed.

As phthalocyanine component, in our invention, a polysulfonate of any of the following compounds may be selected:

Copper, nickel or cobalt phthalocyanine; any of the aforementioned phthalocyanines containing a halogen of the group consisting of chlorine and bromine to an extent of not more than 1 halogen atom, on the average, per molecule; copper-tetraamino phthalocyanine; and metal-free phthalocyanine.

Its sulfo content may be any number (integral or fractional) between 2 and 4, on the average, per molecule. Since we are using an aqueous solution thereof, this sulfonate should preferably be in the form of a water-soluble salt. Common salts satisfying this requirement are the sodium, potassium and ammonium salts; but other cations may also be used, for instance mono-, di- or tri-ethanolammonium.

As basic dye components, we prefer to use the following:

Malachite green (C.I. 657),
Crystal violet (C.I. 681),
Rhodamine 6G (C.I. 752),
Auramine (C.I. 655).

The basic dyestuff may be admixed in the form of its aqueous, alcoholic or aqueous alcoholic solution. Methanol, ethanol or isopropanol are convenient alcohols for this purpose.

The products of this invention therefore may be defined generally by the formula $Q-(SO_3B)_x$, wherein Q stands for the radical of a phthalocyanine polysulfonate, B is a basic dye selected from the group above set forth, and x is an average number of value between 2 and 4, inclusive. When prepared by our novel method above indicated, they give a low-density, dry product of improved solubility in glycolic solvents, the solubility being at least 45% by weight in 2-methyl-2,4-pentanediol.

Without limiting our invention, the following examples are given to illustrate our preferred mode of operation. Parts mentioned are by weight.

*Example 1*

150 parts of auramine (Color Index No. 655) were dissolved at 62° C. in 320 parts of 95% ethanol containing 0.5% benzene. A solution of 78 parts of copper phthalocyanine polyammonium sulfonate (2.7

groups per molecule) in 1225 parts of water was added to the agitated solution of auramine at 80° C. Formation of the water-insoluble salt of the two dyes was completed rapidly as shown by spot tests on wet filter paper. (An excess of either dye ingredient becomes clearly visible by its characteristic color bleed into the wet portion of the paper.) The tarry slurry which formed was subjected to distillation to remove the alcohol as an alcohol-water mixture. After cooling the residual slurry to 60° C. the mother liquor was decanted and the product, a viscous tar, was dried at 70° C. in a vacuum oven at 41 mm. pressure. The dried material was screened through an 80-mesh sieve.

The product dissolved in 2-methyl-2,4-pentanediol to a concentration of 46% by weight, and the solution thus obtained had a viscosity of 10,320 centipoises at 25° C.

*Example 2*

The process of Example 1 was repeated except that the auramine was replaced by 150 parts of rhodamine 6G (C.I. 752), which was dissolved in the ethanol at 70° C., and the 6% aqueous solution which was added contained 90 parts of the copper phthalocyanine polyammonium sulfonate. The dye salt obtained dissolved in 2-methyl-2,4-pentanediol to a concentration of 50% by weight, and the resulting solution had a viscosity of 13,640 centipoises at 25° C.

*Example 3*

The process of Example 1 was repeated except that the auramine was replaced by 150 parts of malachite green (C.I. 657), which was dissolved in the ethanol at 70° C., and the 6% aqueous solution which was added contained 99 parts of the copper phthalocyanine polyammonium sulfonate. The dye salt obtained dissolved in 2-methyl-2,4-pentanediol to a concentration of 50% by weight, and the resulting solution had a viscosity of 6,880 centipoises at 25° C.

*Example 4*

The process of Example 1 was repeated except that the auramine was replaced by 150 parts of crystal violet (C.I. 681) which was dissolved in the ethanol at 70° C., and the 6% aqueous solution which was added contained 165 parts of the copper phthalocyanine polyammonium sulfonate. The dried and screened dye salt obtained dissolved in 2-methyl-2,4-pentanediol to a concentration of 50% by weight, and the resulting solution had a viscosity of 9,480 centipoises at 25° C.

*Example 5*

A solution containing 10.8 parts of copper phthalocyanine polyammonium sulfonate (2.7 $SO_3NH_4$ groups per molecule) and 200 parts of water was adjusted to pH 7.5 at 70° C. by means of $NH_4OH$ and then added to a solution of 15 parts of auramine (C.I. 655) in 150 parts of water at 70° C. After decanting the aqueous portion of the reaction mass, the tarry product was dried in a vacuum oven at 70° C. and screened through an 80-mesh sieve. The dye salt thus obtained was found to exhibit excellent solubility in propylene glycol, and appeared to be in all other respects identical with the product obtained in Example 1.

When the order of mixing the two color components in this example was reversed, similar results were obtained.

If the procedures of Examples 1 to 5 inclusive are repeated except for using other temperatures in the range of 75° to 100° C., similar results are obtained. To insure consistently good results, the range of 80° to 100° C. is recommended. On the other hand, when Examples 1 to 5 inclusive were repeated except for maintaining a temperature of 20° to 25° C. throughout the reaction period, the respective dye salts precipitated in the form of filterable, granular products, which did not have satisfactory solubility in glycolic solvents and proved themselves unsuitable for use in inks for ball pens. The following table compares the solubilities of the two types of products.

| Basic Color | Solubility of Dry Product from— | |
|---|---|---|
| | Granular Precipitate | Molten Precipitate |
| Auramine | Less than 40 | 85 |
| Rhodamine 6G | 85 | 138 |
| Malachite Green | Less than 60 | 100 |
| Crystal Violet | 85 | 138 |

The phthalocyanine component in each case was $CuPc(SO_3NH_4)_x$ wherein $x$ was 2.7. The solubility columns give the maximum quantity in grams which dissolved in 100 grams of 2-methyl-2,4-pentanediol.

*Example 6—Miscellaneous Other Phthalocyanineis*

A 6% aqueous solution by weight of each of the phthalocyanine sulfonic acids indicated in the following table was prepared at 80° C. at a pH of 7.5, adjusted with ammonium hydroxide, and the hot solution was clarified by filtration. 70 to 100 parts of a 45% ethyl alcohol solution of malachite green (C.I. 657) at 70° C. were added to 425 parts of said aqueous solution at 80° C.

When the spot test described in Example 1 indicated complete formation of the water-insoluble dye salt, the addition of basic dye solution was discontinued, and the alcohol was boiled off. The aqueous residue was cooled and the mother liquor was decanted. The dye salt, which remained as a viscous tar, was dried in vacuum at 75° C. and ground through an 80-mesh sieve.

The dye salts obtained were strong, bright green to blue-green ink colors comparable in properties to the color described above in Example 3, and soluble in 2-methyl-2,4-pentanediol to a concentration of at least 50% by weight in each instance.

The phthalocyanine sulfonates thus tested were the following:

A. Copper phthalocyanine tetra-$SO_3K$
B. Copper tetraamino phthalocyanine tetra-$SO_3H$
C. Metal-free phthalocyanine tri-$SO_3Na$
D. Nickel phthalocyanine tetra-$SO_3Na$
E. Copper phthalocyanine containing an average of 0.7 chlorine atom and 3.3 $SO_3Na$ groups per molecule
F. Copper phthalocyanine containing an average of 0.25 bromine atom and 2 $SO_3H$ groups per molecule
G. Cobalt phthalocyanine di-$SO_3H$
H. Cobalt phthalocyanine di-$SO_3H$ containing an average of 0.4 chlorine atom per molecule While the above phthalocyanine polysulfonates are mostly known compounds, the following paragraphs indicate briefly their mode of preparation.

A. The potassium salt of 4-sulfophthalic anhydride is reacted in the conventional "urea process," using trichlorobenzene as solvent, and in the presence of cupric chloride and ammonium molybdate. The dried product is purified by dissolving in aqueous KOH followed by salting from 5% aqueous KCl.

B. Copper tetraamino phthalocyanine (1 part) is sulfonated in 10 parts of 20% oleum for 8 hours at 70° C. The mass is drowned on ice and salt water (5% NaCl) and then filtered. The filter cake is washed nearly acid free with 5% NaCl solution.

C. One part of metal-free phthalocyanine is heated for 2 hours at 75°–80° C. in 9 parts of 40% oleum. The mass is cooled, drowned in a mixture of ice and salt water, and filtered. The filter cake is washed acid free using 20% NaCl solution.

D. One part of nickel phthalocyanine is dissolved in 6.3 parts of 24% oleum and agitated at 85°–90° C. for 5 hours. The hot sulfonation mass is drowned into 42 parts of 10% NaCl solution, filtered and the filter cake is washed acid free using 10% NaCl solution.

E. One part of a mixture containing 70% copper monochlorophthalocyanine (prepared from $Cu_2Cl_2$ and phthalonitrile) and 30% copper phthalocyanine is dissolved in 5.3 parts of 17% oleum and then agitated at 85°–90° C. for 8 hours. The hot sulfonation mass is drowned into 40 parts of 10% NaCl solution, filtered and the filter cake is washed acid free using 10% NaCl solution.

F. One part of a mixture containing 75% copper phthalocyanine and 25% copper monobromophthalocyanine (prepared from $Cu_2Br_2$ and phthalonitrile) is dissolved in 4.5 parts of 7.8% oleum and then agitated at 120°–125° C. for 3.5 hours. The hot sulfonation mass is drowned into 38 parts of 10% NaCl solution, filtered and washed with 10% NaCl solution to reduce the acidity of the filter cake.

G. One part of cobalt phthalocyanine is sulfonated according to the process described in paragraph "F" except that the heating period is preferably 4 hours.

H. One part of a mixture consisting of 60% cobalt phthalocyanine and 40% cobalt monochlorophthalocyanine (prepared from a mixture of 16 mole-% 4-chlorophthalic acid and 84 mole-% phthalic anhydride, $CoCl_2$, urea, ammonium molybdate, and kerosene as diluent is sulfonated by the process described in paragraph "G."

*Example 7—Preparation of Ink*

5 parts of the dried and screened dye salt prepared according to Example 4 were dissolved in 5 parts of 2-methyl-2,4-pentanediol at 80° C. and the ink solution thus obtained was allowed to cool to room temperature. Standard ball-pen ink cartridges were filled with this ink and tested in ball point pens. The results were highly satisfactory.

The products of Examples 1, 2, 3, 5 and 6 when similarly incorporated in inks gave similar results.

In lieu of 2-methyl-2,4-pentanediol other glycolic solvents may be employed as liquid vehicle for the ink. The following solvents are of particular interest in this connection: ethylene glycol, diethylene glycol, propylene glycol, dipropylene glycol, octylene glycol (in admixture with other solvents), other aliphatic diols having from 2 to 8 C-atoms, and diethylene glycol monoalkyl ethers of 1 to 4 C-atoms in the alkyl radical.

The following examples will illustrate further modifications and practical applications of our invention.

*Example 8—Producing a Black Ink*

20.2 parts of auramine (C.I. 655), 9.6 parts of rhodamine 6G (C.I. 752), 24.0 parts of crystal violet (C.I. 681) were dissolved in 136 parts of ethyl alcohol containing 0.5% benzene at 65° C. To this basic dye solution was added 61.6 parts of copper phthalocyanine polyammonium sulfonate containing 2.7 sulfonic acid groups per molecule, as a 6% water solution at 80° C. The product separated as a tar, was dried in a vacuum oven at 70° C., screened through an 80-mesh sieve, and was found to possess at least 50% solubility in propylene glycol, giving a black ball-pen ink.

*Example 9—Conversion of the Granular Form*

A 6% aqueous solution containing 59.6 parts of copper phthalocyanine polyammonium sulfonate (2.7 sulfo groups per molecule) at 25° C. was added to a 5% aqueous solution containing 150 parts of rhodamine 6% (C.I. 752) at 25° C. A granular precipitate of the dye salt separated out and, after testing for complete reaction as described in Example 1, was filtered off and dried at 50° C.

The granular product thus obtained failed to satisfy the solubility requirements specified above and was not suitable for use in inks for ball-point pens. But when this product was placed in a pan, covered with water and heated at 100° C., the product first melted into a tar, and then as evaporation of water continued it solidified again into a friable mass. The latter was then cooled and pulverized to a final powder, passing an 80-mesh sieve.

The solubility of the granular form above when powdered to pass an 80-mesh sieve was 85 grams per 100 grams of 2-methyl-2,4-pentanediol, whereas after the above conversion treatment, the final pulverized product has a solubility of 138 on the same basis.

Essentially the same results were obtained when the above procedure was repeated, using crystal violet in lieu of rhodamine 6G. The solubilities of the granular form before and after conversion were 85 and 138 grams, respectively, per 100 grams of 2-methyl-2,4-pentanediol.

It will be understood that the details of procedure in the above examples may be varied within the skill of those engaged in this art. For instance, the proportions of the acidic and basic dye components are not critical. These may vary over a wide range as noted in the examples. The test given in Example 1 shows which ingredient is present in excess. However, since either component, if used in excess remains in solution and is washed away in the filtrate, the presence of an excess during the salt formation is not harmful.

The order of addition may also be varied, e.g. acid dye to basic dye solution or vice versa. The separate dye components, however, should be in complete solution prior to salt formation in order to insure the best results. When one dye component is added to the reaction mass in powder form, for example, a heterogeneous mixture of dye and dye salt is obtained. Such mixtures do not pass the specifications set forth above for ball-pen ink coloring matters.

It will be clear that our invention provides a simple and economical method for producing ball-pen inks of high quality, satisfying in particular the requirements of strong color, light fastness, fastness to crocking, stability of the ink cartridge as the pen ages, and other established requirements of ball-pen inks.

This application is a continuation-in-part of our application Serial No. 609,073, filed September 11, 1956, and abandoned January 1, 1959.

We claim as our invention:

1. A process of producing a dye salt having high solubility in glycolic solvents and being adapted for use as coloring matter for ball-pen inks, which comprises producing a two-phase mass comprising water and a dye salt of the form $Q-(SO_3B)_x$, wherein Q represents the radical of a phthalocyanine compound selected from the group consisting of copper phthalocyanine, nickel phthalocyanine, cobalt phthalocyanine, halogenated derivatives of these three compounds containing per molecule not more than one atom of a halogen from the group consisting of chlorine and bromine, copper-tetraamino phthalocyanine and metal-free phthalocyanine, $x$ is an average number having a value from 2 to 4, and B represents a molecule of a basic dye selected from the group consisting of malachite green, crystal violet, rhodamine 6G and auramine, said dye salt being in molten state, and the temperature of the entire mass being between 75° and 100° C., separating said dye salt from the aqueous phase, drying the same to produce a brittle dry color mass, and grinding said brittle mass to a size which will pass through an 80-mesh standard sieve.

2. A process of transforming the physical form of a dye salt obtained by heating together, in an aqueous liquid medium and at temperatures below 60° C., a water-soluble phthalocyanine polysulfonate as defined below and a basic dye selected from the group consisting of malachite green, crystal violet, rhodamine 6G and auramine, whereby to improve the glycol solubility of said dye salt, which comprises heating said dye salt in the presence of water at a temperature between 75° and 100° C. until it is transformed into a viscous dye salt, separating said melt from supernatant liquid, and drying the same to produce a brittle mass, said water-soluble phthalocyanine polysulfonate being a water-soluble salt of a phthalocyanine polysulfonic acid of the formula $Q-(SO_3H)_x$, wherein $x$ is an average number having a value from 2 to 4 while Q represents the radical of a phthalocyanine compound selected from the group consisting of copper phthalocyanine, nickel phthalocyanine, cobalt phthalocyanine, halogenated derivatives of these three compounds containing per molecue not more than one atom of a halogen from the group consisting of chlorine and bromine, copper-tetraamino phthalocyanine and metal-free phthalocyanine.

3. A process of producing a basic dye salt of a sulfonated phthalocyanine compound in a dry physical form characterized by improved solutility in 2-methyl-2,4-pentanediol, which comprises mixing an aqueous solution of a water-soluble phthalocyanine polysulfonate as defined in claim 2 with an approximately stoichimetric proportion of a basic dye selected from the group consisting of malachite green, crystal violet, rhodamine 6G and auramine, said basic dye being dissolved in a liquid medium which is miscible with the aqueous solution of said phthalocyanine polysulfonate, maintaining the mixed mass at a temperature of 75° to 100° C. until the reaction product has separated in the form of a tarry precipitate, separating said tarry precipitate from the aqueous phase, drying the same to produce a brittle dry color mass, and grinding said brittle mass to a size which will pass through an 80-mesh standard sieve.

4. A process as in claim 3, wherein the initial phthalocyanine polysulfonate is in the form of a salt selected from the group consisting of the sodium, potassium and ammonium salts.

5. A process as in claim 3, wherein the basic dye is initially dissolved in a medium of the group consisting of water, the lower alcohols, and mixtures of these.

6. A dye salt of the form $Q-(SO_3B)_x$, wherein Q represents the radical of a phthalocyanine compound selected from the group consisting of copper phthalocyanine, nickel phthalocyanine, cobalt phthalocyanine, halogenated derivatives of these three compounds containing per molecule not more than one atom of a halogen from the group consisting of chlorine and bromine, copper-tetraamino phthalocyanine and metal-free phthalocyanine, $x$ is an average number having a value from 2 to 4, and B represents a molecule of a basic dye selected from the group consisting of malachite green, crystal violet, rhodamine 6G and auramine, said dye salt being in a physical form as obtainable by heating together solutions of a polysulfonate of a phthalocyanine compound from the aforementioned group and of a basic dye selected from the aforementioned group according to the process set forth in claim 3, and being distinguished by higher solubility in 2-methyl-2,4-pentanediol than the physical form of the same dye salt when synthesized at temperatures below 60° C.

References Cited in the file of this patent

UNITED STATES PATENTS

| | | |
|---|---|---|
| 2,187,816 | Hartmann et al. | Jan. 23, 1940 |
| 2,528,390 | Sayler | Oct. 31, 1950 |

UNITED STATES PATENT OFFICE

CERTIFICATE OF CORRECTION

Patent No. 2,950,286            August 23, 1960

Calvin Quentin Miller et al.

It is hereby certified that error appears in the printed specification of the above numbered patent requiring correction and that the said Letters Patent should read as corrected below.

Column 1, line 54, for "featured" read -- feathered --; column 5, line 51, for "Phthalocyanineis", in italics, read -- Phthalocyanines --; in italics.

Signed and sealed this 25th day of April 1961

(SEAL)
Attest:

ERNEST W. SWIDER
Attesting Officer

DAVID L. LADD
Commissioner of Patents